Sept. 13, 1938.  M. L. BONFORTE  2,130,293
SINGLE LOCK TIRE CHAIN
Filed Oct. 14, 1936
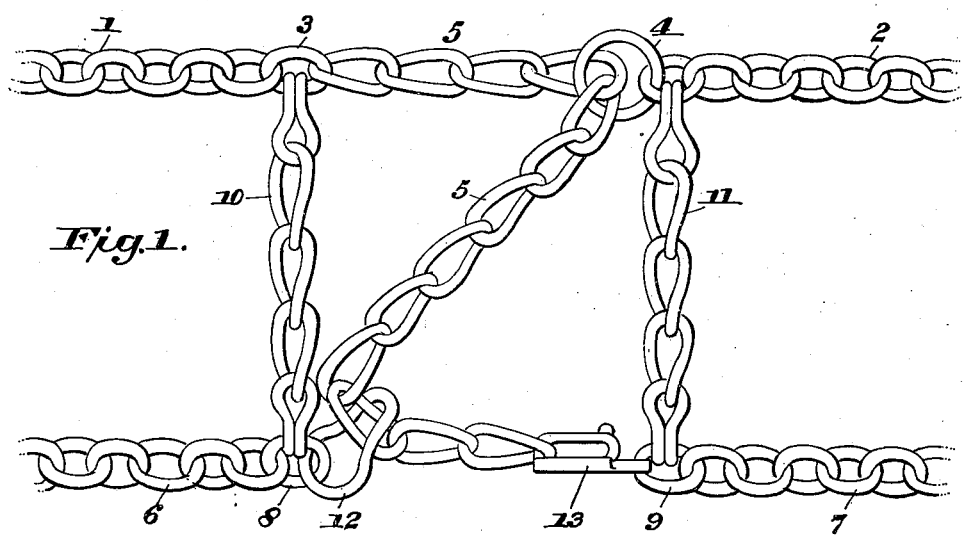
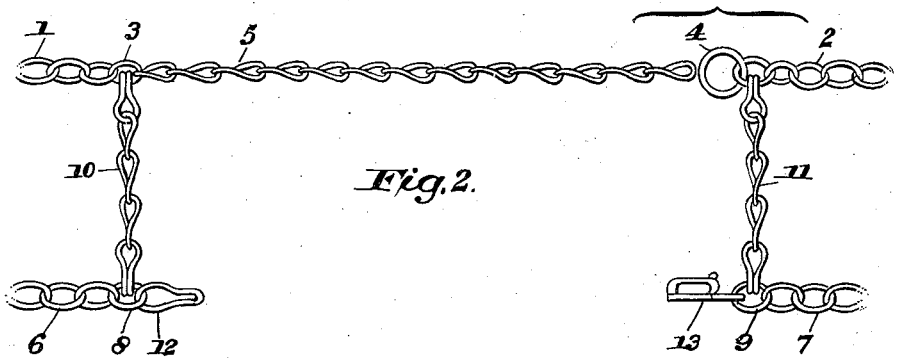
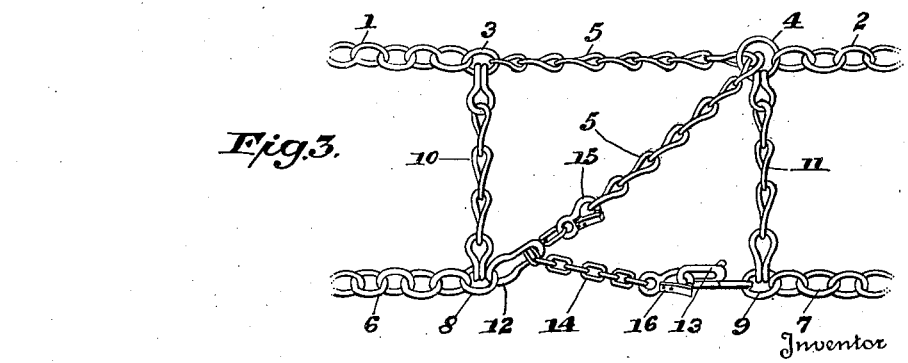
Inventor
Mary Louise Bonforte
By Munn, Anderson & Liddy
Attorney Patented Sept. 13, 1938

2,130,293

UNITED STATES PATENT OFFICE 2,130,293

SINGLE LOCK TIRE CHAIN

Mary Louise Bonforte, Salt Lake City, Utah

Application October 14, 1936, Serial No. 105,619

1 Claim. (Cl. 152—241)

This invention relates to improvements in tire chains, and its objects are as follow:

First, to provide an anti-skid or tire chain which has a single locking device, the principal virtue of which is a quick and easy application and removal of the chain from the tire.

Second, to provide a tire chain in which the aforesaid single locking device is of such a character as to enable fitting the chain to practically any size of tire.

Third, to provide a tire chain and locking device with the foregoing characteristics, which has the added advantage of enabling taking up slack in the chain when slack occurs.

Fourth, to provide a tire chain which is so arranged that the strain on the locking device is much less than in similar chains having the usual dual locking devices.

Other objects and advantages will appear in the following specification, reference being had to the accompanying drawing, in which:

Figure 1 is a plan view of a portion of a tire chain, particularly illustrating the improved single locking device.

Figure 2 is a detail plan view wherein the adjoining ends of the chain are separated, particularly illustrating the extension hereinafter described.

Figure 3 is a detail plan view illustrating the use of a leader chain as when first applying the anti-skid chain to a tire.

As far as prevailing practice is concerned, anti-skid chains are provided with dual locking devices which are necessarily fastened on the opposite sides of the tire. It is most difficult to fasten the inside locking device, namely the one that goes between the tire and the body of the car, the difficulty not being confined so much to the physical exertion required, as to the endeavors that the user makes in avoiding the slush and dirt that have generally accumulated under the fender upon the occasion that has demanded the use of an anti-skid chain.

As has been indicated already by the foregoing statements of the objects of the invention, the instant chain is an improvement over the chains in prevailing use because of the simplicity of its locking device. This will presently be understood and attention is directed to the accompanying drawing for the details. The numerals 1 and 2 denote the confronting ends of a strand of chain which is herein known as the inside chain because this is the one that will be positioned between the tire and the body of the car. The links 3 and 4 comprise the terminals of the chain ends 1, 2, the link 4 preferably being in the form of a ring, as shown, or if not in this form, then sufficiently oversized to enable the easy threading in and drawing through of a chain extension 5 which is secured at one end to the link 3.

The numerals 6 and 7 designate the confronting ends of what is herein known as the outside chain. This is a continuous strand which matches the inside chain, and like the latter has terminal links 8 and 9. The instant tire chain has a plurality of cross strands, as is customary, only one pair being shown. These are designated 10 and 11. The strand 10 has its ends connected to the terminal links 3, 8. One end of the strand 11 is connected to terminal link 9, the other end being connected to a link adjacent to the ring 4. A specially formed link 12, herein conveniently termed a key ring, is connected to the terminal link 8. This link is diagonally opposite to the ring 4, and it is useful in temporarily holding the chain extension 5 at a convenient link while moving the car forward a little to take up the shock whereupon the extremity of the extension 5 is fastened. A fastener 13 of any desired type is attached to the terminal link 9.

In the final application of the chain (Fig. 1) the extension 5 appears threaded through the ring 4 in continuation of the inside chain, then disposed diagonally across toward the outside chain where it is threaded through the special link or key ring 12, the other end of said extension then appearing as a virtual continuation of the outside chain and having its other end secured to the fastener 13. Upon desiring to remove the chain it is only necessary to undo the fastener 13, whereupon the extension 5 will, in most cases, automatically unthread itself from the rings 12, 4, so that the tire chain will fall to the ground.

The relationship of the extension 5 to the inside chain is well illustrated in Fig. 2. It is realized that in some instances the conditions will be such that the extension 5 cannot initially be threaded through the rings 4 and 12 to a sufficient extent to make connection with the fastener 13. Under such a circumstance a small leader chain 14 (Fig. 3) is used. This has snap fasteners 15, 16 on its opposite ends. The snap fastener 15 is attached to the loose end of the extension 5, and then threaded through the rings 4, 12 as shown, the other snap fastener 16 being temporarily attached to the fastener 13. The leader chain holds the tire chain in place while it is being settled and adjusted upon the tire. As the slack occurs during this process the leader chain will be pulled upon until the free terminal of the chain extension 5 comes through the link 12 and can be attached to the fastener 13.

The small leader chain 14 is used only temporarily but is a desirable and important part of the equipment. It must be understood that its purpose is only to aid in making the initial connection of the free end of the chain extension 5. Both snap fasteners 15, 16 are small enough to go through the ring 12. The diagonal position of the medial part of the chain extension 5 (Fig. 1) divides most of the strain between the diagonally opposite rings 4, 12. Naturally there is some strain on the fastener 13, but the arrangement illustrated so balances the strains that the fastener 13 is not likely to be damaged. It is an easy matter to add one or two links to the free end of the extension 5. It is not necessary to attach the last free link to the fastener 13; the proper link should be attached. These provisions make it possible to apply the tire chain to virtually any size of tire, it being a simple matter to add links to the extension when necessary.

In conclusion it is desired to point out that the single-lock tire chain has another feature of no little importance, namely, the ability of completely encircling the tire with the chain and securing the locking means without moving the automobile either forwardly or backwardly or jacking it up. This is possible by virtue of the use of the short extension 14 when added to the extension 5 of one of the side chains.

When a chain is put upon the tire in this manner, it appears as does the average chain. It is only by close inspection that it can be noted that there is a little slack in the chain in the front and rear of the tire. Of course, as soon as the car is moved, this slack can be taken up, and the short extension 14 removed.

I claim:

An anti-skid chain comprising a companion pair of longitudinal chains, respectively to fit circum-annularly inside and outside of a tire, cross chain strands including a pair, the individuals of which are secured at their ends to the matching ends of the longitudinal chains, thus defining four "corners", a link embodied in each of one diagonal pair of corners, a circular ring connected to the third corner, a key ring connected to the diagonally opposite and fourth corner, a single extension chain secured at one end at one of the pair of corners, being threaded through the circular and key rings to provide a diagonal chain strand and fastening means by which the other end of the chain extension is attached to the link on the other one of the pair of corners.

MARY LOUISE BONFORTE.